US007807770B2

(12) United States Patent
Lambert et al.

(10) Patent No.: US 7,807,770 B2
(45) Date of Patent: Oct. 5, 2010

(54) DRAWN TAPES, FIBRE AND FILAMENTS COMPRISING A MULTIMODAL POLYETHYLENE RESIN

(75) Inventors: Yves-Julien Lambert, Chaumont-Gistoux (BE); Andre Frederich, Brussels (BE); Luc Marie Ghislain Dheur, Montroeul-au-Bois (BE)

(73) Assignee: Ineos Manufacturing Belgium NV, Antwerp (BE)

( * ) Notice: Subject to any disclaimer, the term of this patent is extended or adjusted under 35 U.S.C. 154(b) by 377 days.

(21) Appl. No.: 11/667,465

(22) PCT Filed: Nov. 11, 2005

(86) PCT No.: PCT/EP2005/012223

§ 371 (c)(1),
(2), (4) Date: May 10, 2007

(87) PCT Pub. No.: WO2006/053709

PCT Pub. Date: May 26, 2006

(65) Prior Publication Data

US 2007/0287798 A1      Dec. 13, 2007

(30) Foreign Application Priority Data

Nov. 18, 2004    (GB)    .................. 0425444.7

(51) Int. Cl.
*C08L 23/00* (2006.01)
*C08L 23/04* (2006.01)
*D01D 5/12* (2006.01)
*B29C 47/88* (2006.01)
*C08F 110/02* (2006.01)

(52) U.S. Cl. .............. 526/352; 525/240; 428/364; 428/401; 264/210.7; 264/210.8; 264/292; 264/211.12

(58) Field of Classification Search ............. 525/240; 526/352; 428/364, 401; 264/210.8, 210.7, 264/211.12, 292
See application file for complete search history.

(56) References Cited

U.S. PATENT DOCUMENTS

| 3,998,914 | A |   | 12/1976 | Lillis et al. | |
| 4,307,209 | A | * | 12/1981 | Morita et al. | 525/246 |
| 4,668,566 | A | * | 5/1987 | Braun | 442/118 |
| 4,859,749 | A |   | 8/1989 | Franke | |
| 6,329,054 | B1 | * | 12/2001 | Rogestedt et al. | 428/378 |
| 6,645,588 | B1 | * | 11/2003 | Leiden et al. | 428/35.8 |
| 6,787,608 | B2 | * | 9/2004 | VanDun et al. | 525/240 |
| 7,129,296 | B2 | * | 10/2006 | Van Dun et al. | 525/191 |
| 7,232,866 | B2 | * | 6/2007 | Houpert et al. | 526/65 |
| 2004/0151445 | A1 | * | 8/2004 | Martinsson et al. | 385/100 |
| 2004/0266966 | A1 | * | 12/2004 | Schramm et al. | 526/352 |
| 2008/0097054 | A1 | * | 4/2008 | Amos et al. | 526/135 |

FOREIGN PATENT DOCUMENTS

WO    WO 2006/007014 A1    1/2006

OTHER PUBLICATIONS

11667465_Extrusion_definition.*
Shan, Colin Li Pi, et al; "HDPE/LLDPE reactor blends with bimodal microstructures-Part II: rheological properties"; *Polymer*, 44; pp. 177-185 (2003).

* cited by examiner

*Primary Examiner*—Vasu Jagannathan
*Assistant Examiner*—Irina Krylova
(74) *Attorney, Agent, or Firm*—Nixon & Vanderhye

(57) ABSTRACT

Drawn tape, fiber or filament including a multimodal resin having a density of at least 940 kg/m$^3$, a melt index MI$_5$ of 0.05 to 5 g/10 min, and a molecular weight distribution of the resin being less than 40.

15 Claims, No Drawings

DRAWN TAPES, FIBRE AND FILAMENTS COMPRISING A MULTIMODAL POLYETHYLENE RESIN

This application is the U.S. National Phase of International Application PCT/EP2005/012223, filed 11 Nov. 2005, which designated the U.S. PCT/EP2005/012223 claims priority to British Application No. 0425444.7 filed 18 Nov. 2004. The entire content of these applications are incorporated herein by reference.

The present invention concerns tapes, fibres and filaments made from a multimodal ethylene polymer composition, and also concerns a process of manufacture of such a composition.

Tapes, fibres and filaments made from polyethylene are currently manufactured from monomodal compositions such as described in U.S. Pat. No. 4,880,691 for example. No bimodal or multimodal drawn tape/fibre products currently exist. This is because the different blocks in a multimodal product may not be intimately mixed and can have different drawing characteristics, leading to inconsistencies during the drawing process. The presence of gels, another indication of poor homogeneity in the resin, can also cause breakage during drawing. However we have found that tapes, fibres or filaments made from multimodal ethylene polymers can have excellent properties, include tenacity values which can exceed those of similar monomodal products, whilst maintaining a similar level of residual elongation.

Accordingly, in a first aspect the invention provides a drawn tape, fibre or filament comprising a multimodal polyethylene resin having a density of at least 940 kg/m³, a melt index $MI_5$ of 0.05 to 5 g/10 min, and a molecular weight distribution of less than 40.

By "multimodal" is meant a resin made in at least two reactors in series and having at least two components of different molecular weights and/or compositions (ie comonomer content).

It is preferred that the tape, fibre or filament has a relationship between dynamic viscosity $\eta_{0.01}$, measured in Pa·s at 0.01 rad/s and 190° C., and dynamic viscosity $\eta_{100}$, measured in Pa·s at 100 rad/s and 190° C., expressed by the equation $\eta_{100} < x \cdot \eta_{0.01}^{0.55}$, where x=8.7, preferably 8.5, more preferably 7.4, even more preferably 7.1, and most preferably 6.8.

Preferably the tape, fibre or filament has a melt storage modulus G', measured at 190° C. and a dynamic frequency where the loss modulus G"=3000 Pa, of greater than 710 Pa, preferably greater than 760 Pa, and a relationship between said melt storage modulus and the melt storage modulus at a dynamic frequency where the loss modulus G"=500 Pa, expressed by the equation G'(G"=3000)>300+5.5*G'(G"=500), and preferably the equation G'(G"=3000)>375+5.5*G'(G"=500).

Preferably the tape, fibre or filament comprises:
from 30 to 70% by weight based on the total weight of the composition of an ethylene polymer fraction (A) having a melt index $MI_2$ of at least 1 g/10 min and a density of at least 950 kg/m³, said ethylene polymer optionally containing up to 3 wt % of at least one alpha-olefin containing from 4 to 10 carbon atoms; and
from 30 to 70% by weight with based on the total weight of the composition of an ethylene polymer fraction (B) comprising ethylene and optionally up to 10 wt % of at least one alpha-olefin containing from 4 to 10 carbon atoms, and having a melt index $MI_5$ of 0.001 to 1 g/10 min. It is preferred that the ethylene polymer fraction (B) contains ethylene and an alpha-olefin containing from 4 to 10 carbon atoms, and has a density of no more than 950 kg/m³.

For the purposes of the present invention, "ethylene polymer (A)" means an ethylene polymer comprising monomer units derived from ethylene and optionally monomer units derived from other olefins. In the case where ethylene polymer (B) is a copolymer, the term "copolymer of ethylene and of at least one alpha-olefin" means a copolymer comprising monomer units derived from ethylene and monomer units derived from at least one alpha-olefin selected from among the olefinically unsaturated monomers comprising from 4 to 10 carbon atoms such as for example 1-butene, 1-hexene, 1-pentene, 3-methyl-1-butene, 3- and 4-methyl-1-pentenes and 1-octene. Preferred alpha-olefins are 1-butene, 1-hexene, 1-octene and mixtures of them. Particularly preferred are 1-butene and 1-hexene.

For the purposes of the present invention, alpha-olefin content is measured by $RMN^{13}C$ according to the method described in J. C. RANDALL, JMS-REV. MACROMOL. CHEM. PHYS., C29(2&3), p. 201-317 (1989). For example the content of units derived from hexene is calculated from measurements of the integrals of the characteristic spectral lines of hexene (23.4; 34.9 and 38.1 ppm) with respect to the integral of the characteristic spectral line of the units derived from ethylene (30 ppm).

In the case where ethylene polymer (B) is a copolymer, the content of monomer units derived from one or more alpha-olefins, hereinafter called alpha-olefin content, is generally at least 0.5 wt %, in particular at least 1 wt %. The alpha-olefin content of polymer (B) is usually at most 6 wt %, preferably at most 5 wt %. Particularly preferred is an alpha-olefin content between 1 and 3 wt %.

Ethylene polymer (A) may also optionally contain monomer units derived from another olefin. The content of monomer units derived from one or more alpha-olefins in polymer (A), hereinafter called alpha-olefin content, may be up to 3 wt %, more typically up to 1 wt %.

For the purposes of the present invention, melt index $MI_2$ and $MI_5$ respectively mean the melt indices measured according to ASTM standard D 1238 (1986) at a temperature of 190° C. under a load of 2.16 kg and 5 kg respectively. Also, melt index HLMI means the melt index measured according to ASTM standard D 1238 (1986) at a temperature of 190° C. under a load of 21.6 kg.

Polymer (A) preferably has an $MI_2$ of at least 80, more preferably at least 150 g/10 min.

The melt index $MI_5$ of polymer (B) is preferably between 0.005 g/10 min and 1 g/10 min, more preferably no more than 0.5 g/10 min.

The composition according to the invention typically has a melt index $MI_5$ of at least 0.1 g/10 min, preferably at least 0.2 g/10 min. The $MI_5$ of the composition does not usually exceed 4 g/10 min.

Preferably the molecular weight distribution, $M_w/M_n$, of the composition is at least 5, preferably at least 8, more preferably from 5 to 25 and most preferably between 10 and 20. $M_w/M_n$ means the ratio between the mean molecular mass by weight $M_w$ and the mean molecular mass by number $M_n$ of the polymer as they are measured by steric exclusion chromatography (SEC) according to the standards ISO 16014-1 and ISO 16014-4. The SEC is conducted in 1,2,4-trichlorobenzene at 135° C. and 1 ml/min on a WATERS® 150C chromatograph equipped with a detector by refractometry. The injections are effected on a set of four WATERS® HT-6E columns in the following conditions: injection of 400 μl of a 0.5 g/l solution of polymer and of BHT, linear calibration curve based on Mark-Houwink's coefficients for polystyrenes of K=1.21×10$^{-4}$ and a=0.707 and for polyethylenes K=3.92×10$^{-4}$ and a=0.725.

The compositions according to the invention preferably have a standard density measured according to ISO Standard 1183-1 (on a sample prepared according to ISO Standard 293) of at least 942 kg/m$^3$, more particularly at least 944 kg/m$^3$. Preferably the density does not exceed 960 kg/m$^3$. Particularly preferred are compositions whose density is below 952 kg/m$^2$. The density of the polymer (A) present in the compositions according to the invention is preferably at least 955 kg/m$^3$, more preferably at least 960 kg/m$^3$. The density of polymer (B) is preferably at least 910 kg/m$^3$. The density of polymer (B) preferably does not exceed 950 kg/m$^3$.

The quantity of polymer (A) in the ethylene polymers composition according to the invention is preferably at least 35%, more particularly at least 38% by weight with respect to the total weight of the composition. The quantity of polymer (A) does not exceed preferably 65% by weight.

The quantity of polymer (B) is preferably at least 40%. The quantity of polymer (B) does not exceed preferably 65% by weight, more preferably no higher 62 wt %.

The composition according to the invention comprises generally at least 95%, preferably at least 99% by weight of the combination of polymer (A) and of copolymer (B). Most preferred is a composition consisting essentially only of polymer (A) and of polymer (B).

The composition preferably consists of an intimate and homogeneous mixture of polymer (A) and of polymer (B), polymer (B) being prepared in the presence of polymer (A) or vice versa. Thus the composition comprises particles comprising both polymer (A) and polymer (B).

The compositions according to the invention are preferably obtained by means of a manufacturing process, in at least two polymerisation reactors connected in series, according to which process:
- in a first reactor, ethylene is polymerised in suspension in a medium comprising a diluent, hydrogen, optionally at least one alpha-olefin containing from 4 to 10 carbon atoms, a catalyst based on a transition metal and a cocatalyst, so as to form from 30-70% by weight with respect to the total weight of the composition of ethylene polymer (A),
- said medium comprising polymer (A) in addition is drawn off from said reactor and is subjected to expansion so as to degas at least part of the hydrogen and any alpha-olefin present, after which
- said at least partially degassed medium comprising polymer (A) and some ethylene and optionally at least another alpha-olefin containing from 4 to 10 carbon atoms are introduced into a further reactor in which polymerisation in suspension is effected in order to form from 30-70% by weight with respect to the total weight of the composition of ethylene polymer (B).

Polymerisation in suspension means polymerisation in a diluent which is in the liquid state in the polymerisation conditions (temperature, pressure) used, these polymerisation conditions or the diluent being such that at least 50% by weight (preferably at least 70%) of the polymer formed is insoluble in said diluent.

The diluent used in this polymerisation process is usually a hydrocarbon diluent, inert to the catalyst, to the cocatalyst and to the polymer formed, such for example as a linear or branched alkane or a cycloalkane, having from 3 to 8 carbon atoms, such as hexane or isobutane.

The quantity of hydrogen introduced into the first reactor is in general set so as to obtain, in the diluent, a molar ratio between hydrogen and ethylene of 0.05 to 1. In the first reactor, this molar ratio is preferably at least 0.1. Particularly preferred is a hydrogen/ethylene molar ratio that does not exceed 0.6.

The medium drawn off from the first reactor comprising in addition the polymer (A) is subjected to expansion so as to eliminate (degas) at least part of the hydrogen. The expansion is advantageously effected at a temperature below or equal to the polymerisation temperature in the first reactor. The temperature at which the expansion is effected is usually greater than 20° C., it is preferably at least 40° C. The pressure at which the expansion is effected is below the pressure in the first reactor. The expansion pressure is preferably below 1.5 MPa. The expansion pressure is usually at least 0.1 MPa. The quantity of hydrogen still present in the at least partially degassed medium is generally below 1% by weight of the quantity of hydrogen initially present in the medium drawn off from the first polymerisation reactor, this quantity is preferably below 0.5%. The quantity of hydrogen present in the partially degassed medium introduced into the further polymerisation reactor is therefore low or even nil. The further reactor is preferably also supplied with hydrogen. The quantity of hydrogen introduced into the further reactor is in general set so as to obtain, in the diluent, a molar ratio between hydrogen and ethylene of 0.001 to 0.1. In this further reactor, this molar ratio is preferably at least 0.004. It does not exceed preferably 0.05. In the process according to the invention, the ratio between the hydrogen concentration in the diluent in the first reactor and that in the further polymerisation reactor is usually at least 20, preferably at least 30. Particularly preferred is a ratio of concentrations of at least 40. This ratio does not usually exceed 300, preferably not 200.

The quantity of alpha-olefin introduced into the further polymerisation reactor, if it is required, is such that in that reactor the alpha-olefin/ethylene molar ratio in the diluent is at least 0.05, preferably at least 0.1. The quantity of alpha-olefin introduced into the further reactor is such that the alpha-olefin/ethylene molar ratio does not exceed 3, preferably not 2.8.

The preferred catalyst used to make the compositions of the invention comprises at least one transition metal. Transition metal is understood to denote a metal from Groups 4, 5 or 6 of the Periodic Table of the Elements (CRC Handbook of Chemistry and Physics, 75th edition, 1994-95). The transition metal is preferably titanium and/or zirconium. Titanium is particularly preferred. In the process according to the invention, use is preferably made of a catalyst comprising, in addition to the transition metal, magnesium. Good results have been obtained with catalysts comprising:

from 5 to 30%, preferably from 15 to 20%, by weight of transition metal, from 0.5 to 20%, preferably from 1 to 10%, by weight of magnesium, from 20 to 60%, preferably from 30 to 50%, by weight of halogen, such as chlorine, from 0.1 to 10%, preferably from 0.5 to 5%, by weight of aluminium; the balance generally being composed of elements originating from the products used in their manufacture, such as carbon, hydrogen and oxygen.

These catalysts are preferably obtained by coprecipitation of at least one transition metal compound and of a magnesium compound by means of a halogenated organoaluminium compound. Such catalysts are known; they have been disclosed particularly in U.S. Pat. No. 3,901,863, U.S. Pat. No. 4,929,200 and U.S. Pat. No. 4,617,360 (Solvay). In the process according to the invention, the catalyst is preferably introduced solely into the first polymerization reactor, that is to say that fresh catalyst is not introduced into the subsequent polymerization reactor. The amount of catalyst introduced into the first reactor is generally adjusted so as to obtain an amount of at least 0.5 mg of transition metal per liter of diluent. The amount of catalyst usually does not exceed 100 mg of transition metal per liter of diluent.

Alternative preferred catalysts contain 5 to 30% by weight of transition metal, 0.5 to 20% by weight of magnesium, 20 to 60% by weight of chlorine and 0.1 to 10% by weight of aluminium, and have a residual organic radical content in the precipitated catalyst of less than 35 wt %. These catalysts are also obtained by coprecipitation of at least one transition metal compound and a magnesium compound by means of a halogenated organoaluminium compound, but with a ratio of transition metal to magnesium of no more than about 1:1. They are described in more detail in our own EP 703247B. Preferred such catalysts have the following composition:

Transition metal from 8 to 16% by weight

Magnesium content from 5 to 15% by weight

Chlorine content from 40 to 60% by weight

Aluminum content less than 5% by weight

Residual organic content less than 35% by weight

Total alkyl benzoate content less than 20% by weight.

The cocatalyst utilised in the process is preferably an organoaluminium composition. Unhalogenated organoaluminium compositions of formula $AlR_3$ in which R represents an alkyl grouping having from 1 to 8 carbon atoms are preferred. Particularly preferred are triethylaluminium and tri-isobutylaluminium. The cocatalyst is introduced into the first polymerisation reactor. Fresh cocatalyst may also be introduced into the further reactor. The quantity of cocatalyst introduced into the first reactor is in general at least $0.1 \times 10^{-3}$ mole per liter of diluent. It does not usually exceed $5 \times 10^{-3}$ mole per liter of diluent. Any quantity of fresh cocatalyst introduced into the further reactor does not usually exceed $5 \times 10^{-3}$ mole per liter of diluent.

The polymerisation temperature is generally from 20 to 130° C. It is preferably at least 60° C. For preference, it does not exceed 115° C. The total pressure at which the process is effected is in general from 0.1 MPa to 10 MPa. In the first polymerisation reactor, the total pressure is preferably at least 2.5 MPa. For preference, it does not exceed 5 MPa. In the further polymerisation reactor, the total pressure is preferably at least 1.3 MPa. For preference, it does not exceed 4.3 MPa.

The period of polymerisation in the first reactor and in the further reactor is in general at least 20 minutes, preferably at least 30 minutes. The period of polymerisation does not usually exceed 5 hours, preferably not 3 hours.

In this process, a suspension comprising a composition comprising from 30 to 70% by weight of polymer (A) and from 30 to 70% by weight of polymer (B) is collected at the outlet of the further polymerisation reactor. The ethylene polymer composition may be separated from the suspension by any known means. Usually, the suspension is subjected to a pressure expansion (final expansion) so as to eliminate the diluent, the ethylene, the alpha-olefin and any hydrogen from the composition.

The polymer may additionally contain the usual stabilizers and processing aids.

During the manufacture of tapes, filaments or fibres, the polymer from which they are made is typically stretched following extrusion. Whichever method of manufacture is used, it is preferred that the polymer has been stretched to at least 4 times its original length; typically from 6 to 10 times, and most preferably 7 to 8 times. Stretching further improves the tensile strength of the final product, but often at the expense of residual elongation.

Usually, the polymer is formed into tapes or monofilaments which are then woven into nets. In a typical tape process the material is first melted and then blown into a film. The film can be produced using well-known processes such as film blowing, film casting, coextrusion, cast film extrusion or lamination in the form of single-layer films, multilayer films or sheets. Multilayer systems can be produced by coextrusion, coating, extrusion coating, laminating or printing. The film is then stretched, and the stretched film cut into tapes which are woven or knitted into nets. This is known as the Lenzing process. In an alternative process (the Iso process), the blown film is cut into tapes prior to stretching. Alternatively the material is extruded into monofilaments, which are then stretched prior to weaving.

In a typical production process, the polymer is fed into an extruder and extruded to form a film. Where a blown film is required, the polymer exits the extruder via a circular die, and the film is blown from a nozzle in the centre of the die. For flat films, the polymer exits the extruder via a flat die. Flat films are generally thicker than blown films. Typically the film is then stretched at this stage. Stretching is usually carried out in an oven or on a hot plate at a temperature of 100-110° C., at a stretch ratio preferably between 7 and 8 for blown films, and 4 to 6 for flat films. Optionally the stretched film may then be annealed. The film is then slit into tapes.

It is preferred that the tapes of the invention derive from a resin which when drawn to 7 times its original length it has a tenacity of at least 30 cN/Tex and a residual elongation of at least 25%. Preferably, the tapes derive from a resin which when drawn to 9 times its original length it has a tenacity of at least 45 cN/Tex and a residual elongation of at least 18%.

The following examples are intended to illustrate the invention.

EXAMPLES

A) Catalyst

Magnesium diethoxide was reacted with titanium tetrabutoxide for 4 hours at 150° C. in an amount such that the molar ratio of titanium to magnesium was equal to 2. The reaction product thus obtained was subsequently chlorinated and precipitated by bringing the latter into contact with an ethylaluminium dichloride solution (EADC) for 90 minutes at 45° C. The EADC/Mg ratio was 6.5 mole/mole. The obtained slurry was subsequently aged at 60° C. for 45 minutes, and then cooled at ambient temperature (<35° C.). The by-products from the chlorination reaction were removed from the slurry by washing the solid with polymerisation grade hexane at ambient temperature. The catalyst thus obtained, collected from the suspension, comprised (% by weight): Ti: 17; Cl: 41; Al: 2; Mg: 5.

B) Composition

The manufacture of a composition comprising ethylene polymers was carried out in suspension in isobutane in two loop reactors of volume 200 L and 300 L respectively, connected in series and separated by a device which makes it possible continuously to carry out the reduction in pressure. Isobutane, ethylene, hydrogen, triethylaluminium and the above catalyst were continuously introduced into the first loop reactor and the polymerization of ethylene was carried out in this mixture in order to form the polymer (A). The said mixture, additionally comprising the polymer (A), was continuously withdrawn from the said reactor and was subjected to a reduction in pressure (~50° C., 0.6 MPa), so as to remove at least a portion of the hydrogen. The resulting mixture, at least partially degassed of hydrogen, was then continuously introduced into a second polymerization reactor, at the same time as ethylene, hexene, isobutane and hydrogen, and the polymerization of the ethylene and of the hexene was carried out therein in order to form the ethylene/1-hexene copolymer (B). The suspension comprising the composition comprising ethylene polymers was continuously withdrawn from the second reactor and this suspension was subjected to a final reduction in pressure, so as to evaporate the isobutane and the reactants present (ethylene, hexene and hydrogen) and to recover the composition in the form of a powder, which was subjected to drying in order to complete the degassing of the isobutane.

Dynamic Rheological Analysis

Rheological measurements were carried out on a dynamic rheometer (e.g., Rheometrics RDS-2, ARES) with 25 mm diameter parallel plates in a dynamic mode. For all experiments, the rheometer was thermally stable at 190° C. for at least 30 minutes before inserting the appropriately stabilised (with anti-oxidant additives), compression-moulded sample of resin onto the parallel plates. The plates were then closed with a positive normal force registered on the meter to ensure good contact. After about 5 minutes at 190° C., the plates were lightly compressed and the surplus polymer at the circumference of the plates trimmed. A further 10 minutes was allowed for thermal stability and for the normal force to decrease back to zero.

Two strain sweep (SS) experiments were initially carried out at 190° C. to determine the linear viscoelastic strain that would generate a torque signal which is greater than 10% of the lower scale of the transducer, over the full frequency (e.g. 0.01 to 100 rad/s) range. The first SS experiment was carried out with a low applied frequency of 0.1 rad/s so as to determine the sensitivity of the torque at low frequency. The second SS experiment was carried out with a high applied frequency of 100 rad/s to ensure that the selected applied strain is well within the linear viscoelastic region of the polymer so that the oscillatory rheological measurements do not induce structural changes to the polymer during testing. In addition, a time sweep (TS) experiment was carried out with a low applied frequency of 0.1 rad/s at the selected strain (as determined by the SS experiments) to check the stability of the sample during testing.

Measurement of Melt Elastic Moduli G'(G"=3000 Pa) and G'(G"=500 Pa) and Complex Dynamic shear viscosity, $\eta_{0.01}$, at 190° C.

The frequency sweep (FS) experiment was then carried out at 190° C. using the above appropriately selected strain level between dynamic frequencies range of 0.01 to 100 rad/s. The dynamic rheological data thus measured were then analysed using the rheometer software (viz., Rheometrics RHIOS V4.4 or Orchestrator Software) to determine the melt elastic moduli G'(G"=3000 Pa) and G'(G"=500 Pa) at two reference melt viscous moduli (G") values of G"=3000 Pa and G"=500 Pa, respectively. If necessary, the values were obtained by interpolation between the available data points using the Rheometrics software.

The complex dynamic shear viscosities measured in Pa·s, $\eta^*(0.01)$ at a dynamic frequency of 0.01 rad/s, and $\eta^*(100)$ at a dynamic frequency of 100 rad/s, were determined directly from the $\eta^*$ data of the frequency sweep (FS) experiment measured at 190° C.

TABLE 1

| | | EXAMPLES | | | | | | | | | |
|---|---|---|---|---|---|---|---|---|---|---|---|
| | | 1 | 2 | 3 | 4 | 5 | 6 | 7# | 8* | 9** | 10 |
| | | Polymer A | | | | | | | | | |
| wt % | | 50 | 48 | 50 | 45 | 55 | 40 | 49 | | | 60 |
| MI$_{2\,(8/2)}$ | g/10 min | 400 | 420 | 450 | 150 | 140 | 450 | 110 | | | 2.5 |
| Density | kg/m³ | 973.3 | 972.0 | 973.0 | 971.0 | 971.0 | 964.2 | 970.0 | | | 960.8 |
| C6 content | wt % | — | — | — | — | — | 0.5 | — | | | — |
| | | Polymer B (calculated values) | | | | | | | | | |
| wt % | | 50 | 52 | 50 | 55 | 45 | 60 | 51 | | | 40 |
| MI$_5$ | g/10 min | 0.24 | 0.12 | 0.13 | 0.12 | 0.13 | 0.25 | 0.70 | | | 0.51 |
| Density | kg/m³ | 924 | 920 | 919 | — | 932 | 932 | 932 | | | 954.4 |
| C4 content | wt % | — | 3.0 | — | — | 2.2 | — | 6.8 | | | — |
| C6 content | wt % | 4.5 | — | 5.7 | — | — | 2.4 | — | | | — |
| | | RESIN | | | | | | | | | |
| MI$_5$ | g/10 min | 2.7 | 1.3 | 1.6 | 0.9 | 1.9 | 1.6 | 5.3 | 1.9 | 1.2 | 2.5 |
| $\eta^*$ @ 100 rad/s | Pa · s | 1213 | 1643 | 1335 | 2039 | 1360 | 1645 | 890 | 1932 | 2209 | 1708 |
| $\eta^*$ @ 0.01 rad/s | Pa · s | 16628 | 29565 | 27383 | 39141 | 26615 | 24624 | 10450 | 23610 | 21369 | 17300 |
| G' (G" = 3000 Pa) | Pa | 889 | 817 | 975 | 823 | 1052 | 837 | 1079 | 898 | 926 | 768 |
| G' (G" = 500 Pa) | Pa | 73 | 66 | 84 | 73 | 107 | 77 | 110 | 101 | 107 | 78 |
| Density | kg/m³ | 949.3 | 945.4 | 945.0 | 958.5 | 955.2 | 945.8 | 951.6 | 944.0 | 944.5 | 958.3 |
| Total C4 | wt % | — | 1.6 | | — | 1.0 | | 3.4 | | | — |
| Total C6 | wt % | 2.3 | — | 2.9 | — | — | 1.7 | | | | — |
| Mw/Mn | | 17 | — | 18.0 | 14.4 | 14.4 | 13.9 | 12.7 | | | — | comparative example, bimodal but with high MI$_5$
*comparative example, Eltex ® A5006 FN1280 (monomodal)
**comparative example, Eltex ® A5006 FN1362 (monomodal)

The resins of Examples 1-9 were then formed into tapes using the Iso process described above, during which film from which the tapes were cut was stretched either 7, 8 or 9 times. The tapes were subjected to tensile strength tests in order to evaluate their suitability for use in applications such as nets. Tensile tests were performed at 23° C. at a stretching rate of 200 mm/minute, with a gauge length of 200 mm, a load range of 2500 N and an extension range of 2000 mm. Results are shown in Table 2 below, where Examples 1-6 can be compared with the comparative examples 7-9.

TABLE 2

| | EXAMPLES | | | | | | | | |
|---|---|---|---|---|---|---|---|---|---|
| | 1 | 2 | 3 | 4 | 5 | 6 | 7* | 8* | 9** |
| Stretched 7× | | | | | | | | | |
| Tex (g/1000 m) | 81 | 72 | 84 | 71 | 66 | 84 | 57 | 63 | 61 |
| Ave elongation % | 38 | 33 | 32 | 30 | 29 | 35 | 39 | 33 | 28 |
| Ave tenacity cN/Tex | 33 | 40 | 38 | 44 | 39 | 36 | 28 | 33 | 40 |
| Stretched 8× | | | | | | | | | |
| Tex (g/1000 m) | 71 | 63 | 73 | 63 | 59 | 72 | 48 | 54 | 53 |
| Ave elongation % | 26 | 25 | 25 | 24 | 25 | 29 | 26 | 25 | 24 |
| Ave tenacity cN/Tex | 42 | 51 | 48 | 55 | 50 | 49 | 35 | 43 | 51 |
| Stretched 9× | | | | | | | | | |
| Tex (g/1000 m) | 65 | 56 | 62 | 55 | 53 | 64 | 43 | 47 | 52 |
| Ave elongation % | 23 | 19 | 22 | 19 | 20 | 25 | 22 | 20 | 20 |
| Ave tenacity cN/Tex | 50 | 55 | 58 | 61 | 58 | 58 | 43 | 50 | 57 |

For tapes, as tenacity is increased, elongation to break decreases. Tenacity can be increased by increasing the stretch ratio: in the above examples, the tapes are stretched 7, 8 and 9 times. All the bimodal examples (Examples 1 to 6) exhibit higher tenacities than the monomodal examples (8 and 9) whilst maintaining at least the same residual elongation. Example 7 has lower tenacity than the monomodal resins due to its excessively high melt index $MI_5$. In all the examples, increasing the stretch ratio from 7 to 8 and then 9 results in an increase in tenacity of about 20-30% each time, with the tenacity value at 9× stretch being about 50% greater than at 7× stretch.

The invention claimed is:

1. A drawn tape, fibre or filament comprising a multimodal polyethylene resin having:
a density of at least 940 kg/m$^3$,
a melt index $MI_5$ of 0.05 to 5 g/10 min,
a molecular weight distribution ($M_w/M_n$) of less than 40,
a relationship between dynamic viscosity $\eta_{0.01}$, measured in Pa·s at 0.01 rad/s and 190° C., and dynamic viscosity $\eta_{100}$, measured in Pa·s at 100 rad/s and 190° C., expressed by the equation $\eta_{100} < x \cdot \eta_{0.01}^{0.55}$, where x=7.4,
a melt storage modulus G', measured at 190° C. and a dynamic frequency where the loss modulus G"=3000 Pa, of greater than 710 Pa, and
a relationship between said melt storage modulus and the melt storage modulus at a dynamic frequency where the loss modulus G"=500 Pa, expressed by the equation G'(G"=3000)>300+5.5*G'(G"=500),
wherein the tape, fibre or filament has been drawn to at least 4 times its original length.

2. Tape, fibre or filament according to claim 1, comprising from 30 to 70% by weight based on the total weight of the composition of an ethylene polymer fraction (A) having a melt index $MI_2$ of at least 1 g/10 min and a density of at least 950 kg/m$^3$, said ethylene polymer optionally containing up to 3 wt % of at least one alpha-olefin containing from 4 to 10 carbon atoms; and
from 30 to 70% by weight with based on the total weight of the composition of an ethylene polymer fraction (B) comprising ethylene and optionally up to 10 wt % of at least one alpha-olefin containing from 4 to 10 carbon atoms, and having a melt index $MI_5$ of 0.001 to 1 g/10 min.

3. Tape, fibre or filament according to claim 2, wherein the ethylene polymer fraction (B) contains ethylene and an alpha-olefin containing from 4 to 10 carbon atoms, and has a density of no more than 950 kg/m$^3$.

4. Tape, fibre or filament according to claim 2, wherein it comprises 35-65% by weight with respect to the total weight of the composition of the ethylene polymer fraction (A).

5. Tape, fibre or filament according to claim 1, wherein it has a density of from 942-960 kg/m$^3$.

6. Tape, fibre or filament according to claim 1, wherein it has an $MI_5$ of 0.1-4 g/10 min.

7. Tape, fibre or filament according to claim 1, wherein it has a molecular weight distribution ($M_w/M_n$) of 5-25.

8. Tape, fibre or filament according to claim 7, wherein it has a molecular weight distribution ($M_w/M_n$) of 10-20.

9. Tape, fibre or filament according to claim 1, wherein the alpha-olefin, if present, is selected from the group consisting of 1-butene, 1-pentene and 1-hexene.

10. Tape, fibre or filament according to claim 1, wherein it derives from a resin which when drawn to 7 times its original length it has a tenacity of at least 30 cN/Tex and a residual elongation of at least 25%.

11. Tape, fibre or filament according to claim 1, wherein it derives from a resin which when drawn to 9 times its original length it has a tenacity of at least 45 cN/Tex and a residual elongation of at least 18%.

12. Process for producing a tape, fibre or filament as defined in claim 1, which process comprises:
in a first reactor, polymerizing ethylene in suspension in a medium comprising a diluent, hydrogen, a catalyst based on a transition metal and a cocatalyst and optionally at least one α-olefin containing from 4 to 10 carbon atoms so as to form 30 to 70% by weight with respect to the total weight of the composition of the ethylene polymer (A),
drawing off said medium, additionally comprising the polymer (A), from said reactor and subjecting said medium to expansion so as to degas at least part of the hydrogen and any alpha-olefin present, and then
introducing said at least partially degassed medium comprising polymer (A) and some ethylene and optionally at least one other α-olefin containing from 4 to 10 carbon atoms into a further reactor connected in series with said first reactor and performing polymerisation in suspension in said further reactor in order to form from 30 to 70% by weight with respect to the total weight of the composition of the ethylene polymer (B) to form a resin, and
forming a tape, fibre or filament from said resin.

13. Process according to claim 12, wherein the catalyst utilized comprises from 5 to 30% by weight of transition metal, from 0.5 to 20% by weight of magnesium, from 20 to 60% by weight of a halogen and from 0.1 to 10% by weight of aluminium.

14. Tape, fibre or filament according to claim 1, having a melt storage modulus G' of greater than 760 Pa, and a relationship between said melt storage modulus and the melt storage modulus at a dynamic frequency where the loss modulus G"=500 Pa, expressed by the equation G'(G"=3000) >375+5.5* G'(G"=500).

15. Tape, fibre or filament according to claim 1, wherein it has been drawn to between 6 and 10 times its original length.

* * * * *